Figure 1:
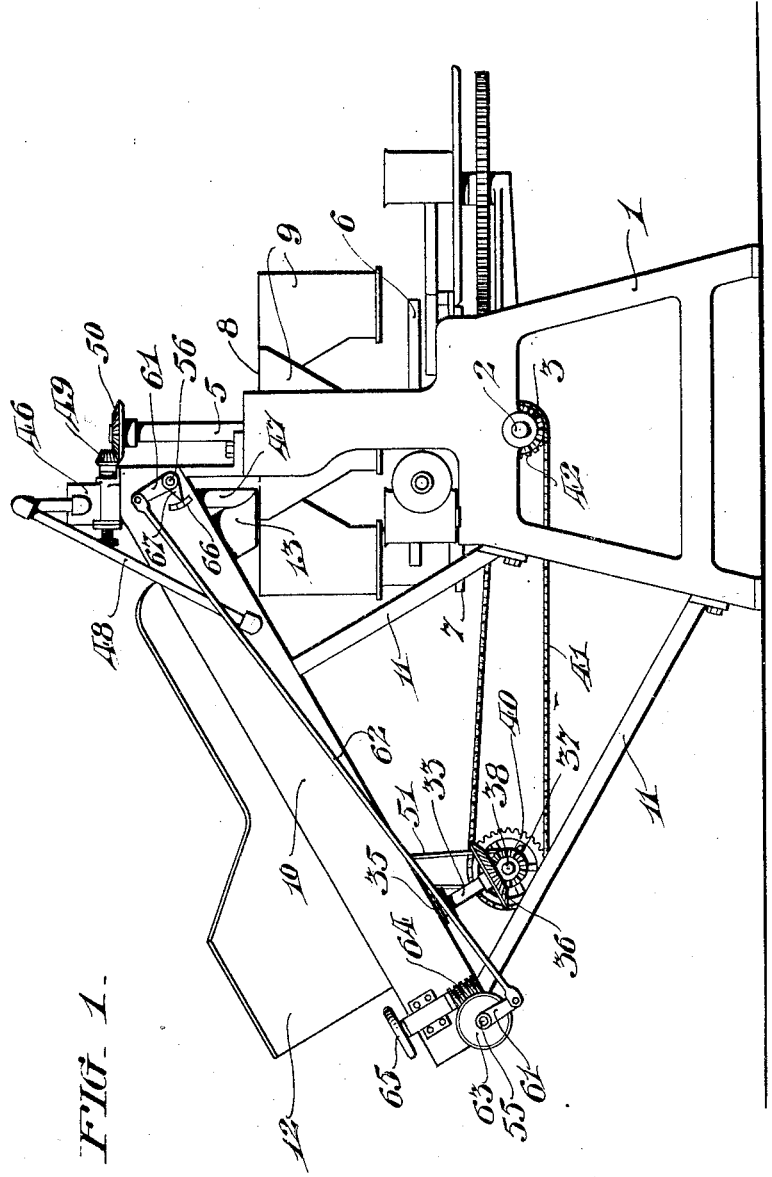

Jan. 31, 1928. 1,657,774
C. H. AYARS
CANNING MACHINE
Filed Jan. 16, 1926 7 Sheets-Sheet 2

Jan. 31, 1928.

C. H. AYARS 1,657,774

CANNING MACHINE

Filed Jan. 16, 1926     7 Sheets-Sheet 6

WITNESSES:
Alfred E. Dichinger
George A. Gruss

INVENTOR:
Charles H. Ayars,
BY
Joshua R. H. Potts
ATTORNEY.

Jan. 31, 1928.  1,657,774
C. H. AYARS
CANNING MACHINE
Filed Jan. 16, 1926   7 Sheets-Sheet 7

WITNESSES:
Alfred E. Ischinger.
George A. Gruss

INVENTOR:
Charles H. Ayars,
BY
Joshua R. H. Potts
ATTORNEY.

Patented Jan. 31, 1928.

1,657,774

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CANNING MACHINE.

Application filed January 16, 1926. Serial No. 81,702.

For canning whole fruits or vegetables, tomatoes for example, the canning machines are usually provided with some kind of leveling device to provide for getting a uniform quantity of tomatoes into the cans. While the leveling mechanism may function efficiently, its action is positive and frequently either crushes a tomato or cuts off a part thereof.

One object of my invention is to provide a feeding attachment for canning machines whereby tomatoes or other fruits or vegetables may be fed to the machine in measured quantities without danger of crushing or removing parts.

Another object of the invention is to provide liquid feeding mechanism which will co-operate with the mechanism for feeding solids to insure getting the required quantity of liquid into the cans.

Figure 2:
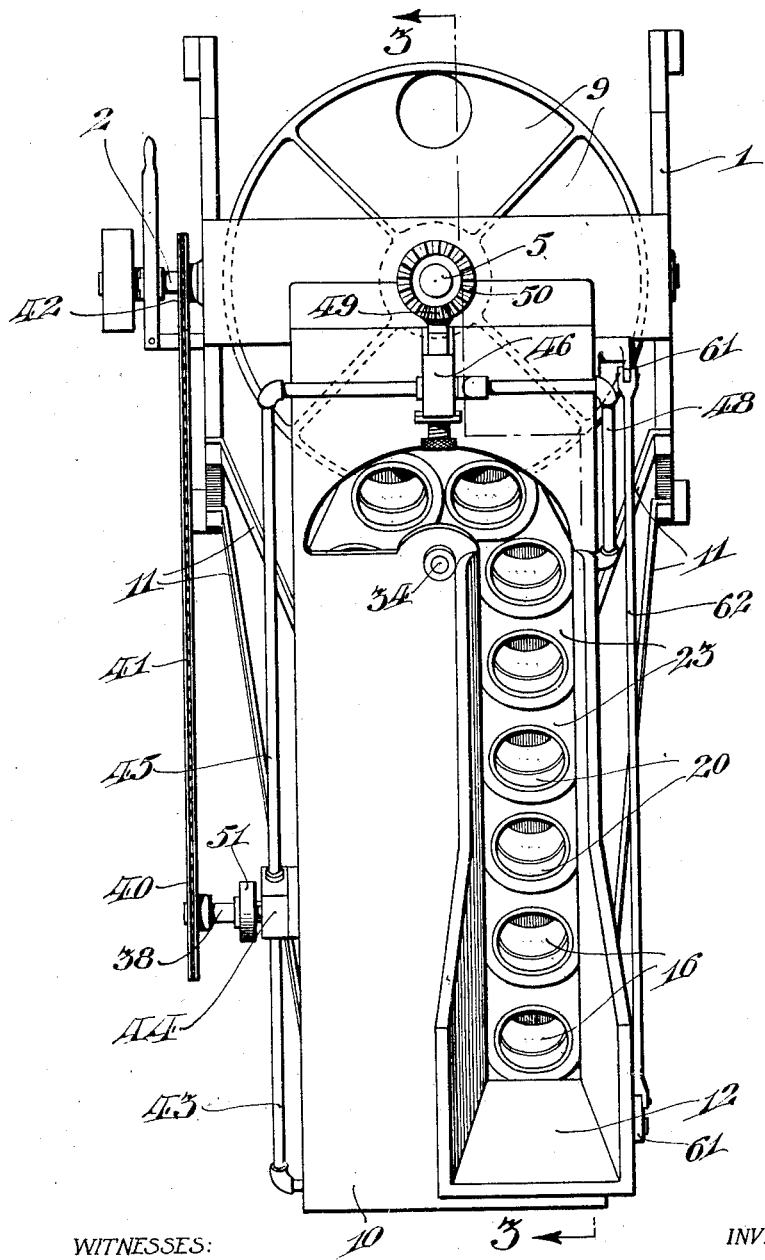
Figure 3:
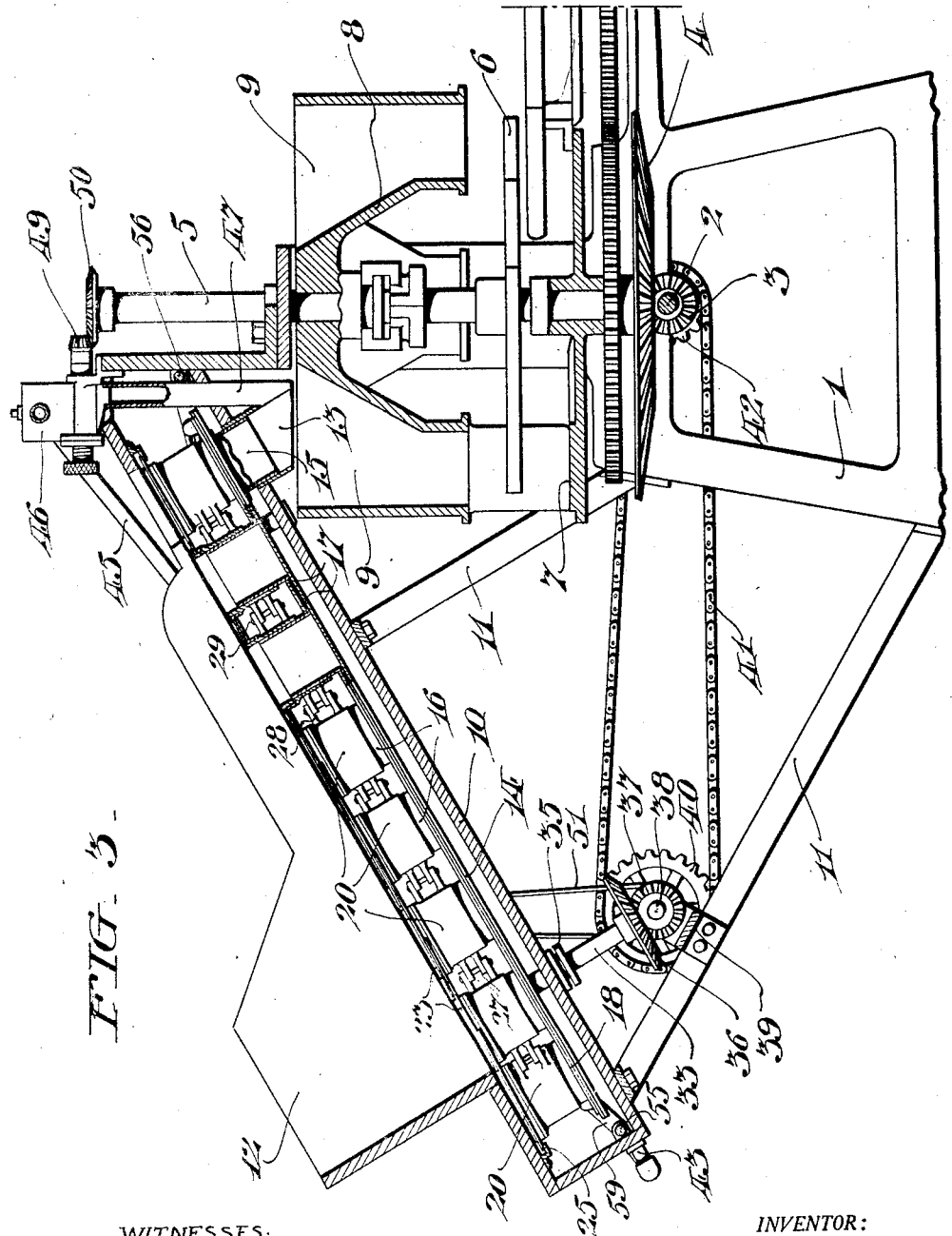
Figure 4:
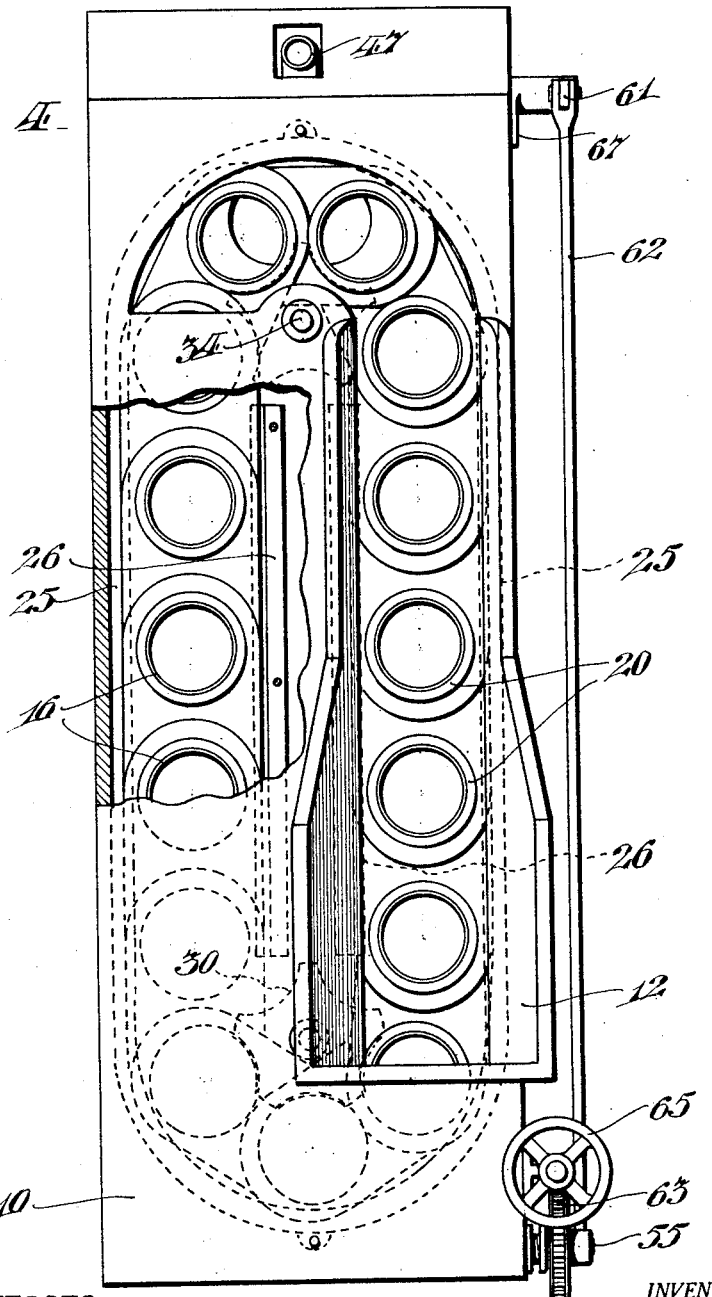
Figure 5:
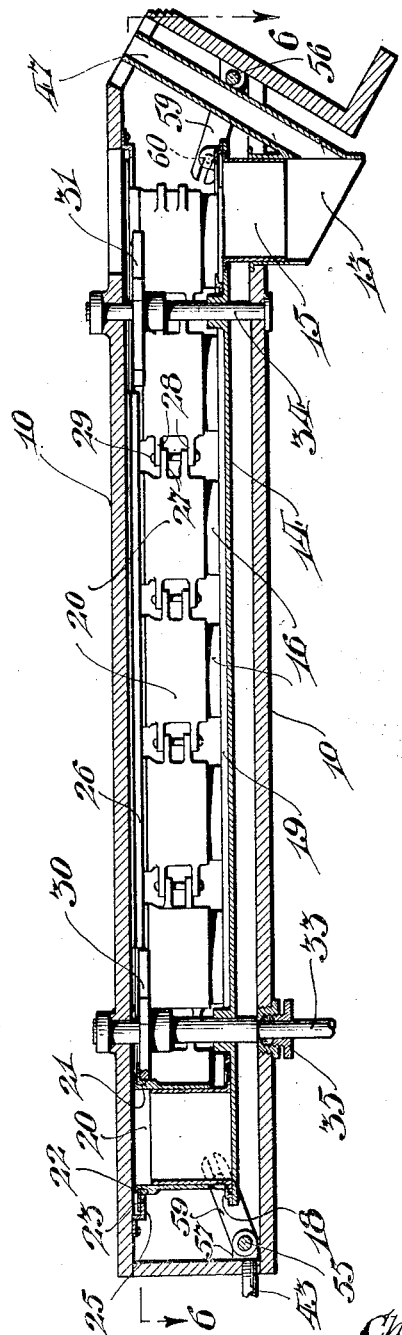
Figure 6:
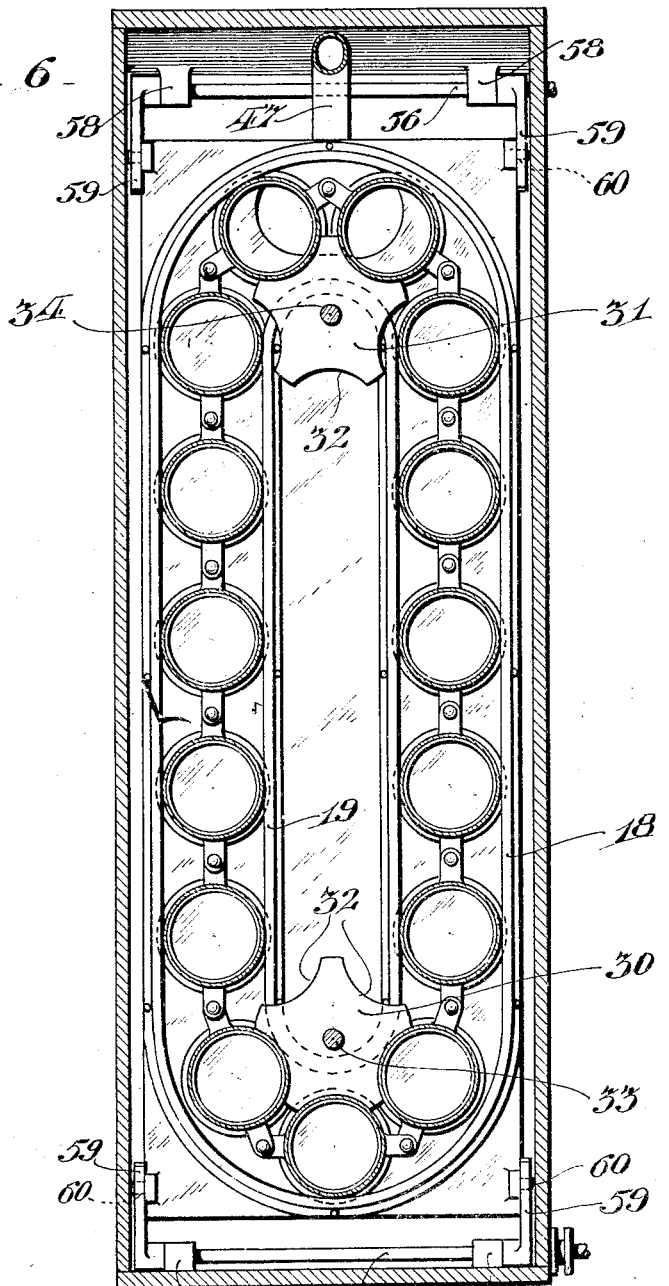
Figure 7:
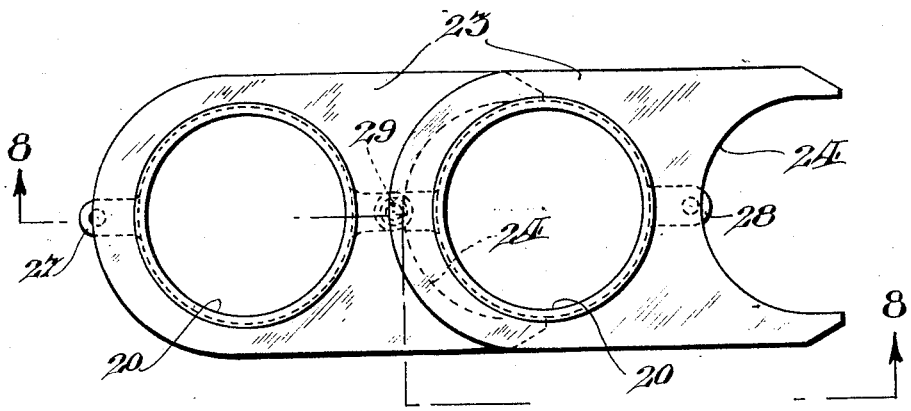
Figure 8:
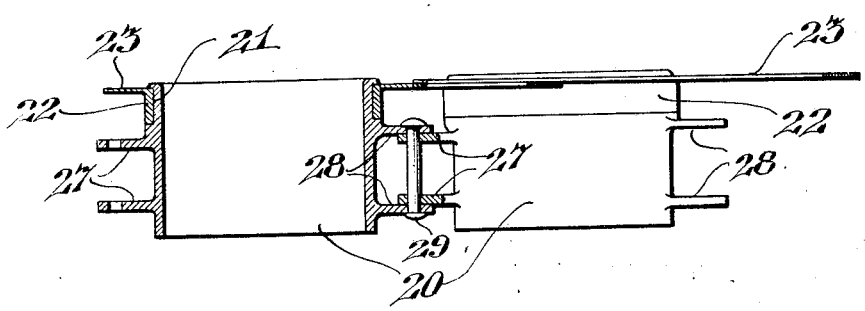

In the drawings,

Figure 1 is a side elevation of a canning machine with my feeding attachment applied thereto, Figure 2 a plan view of the same, Figure 3 a section on line 3—3 of Figure 2, Figure 4 a plan view, partly broken away, of the conveying mechanism, Figure 5 a central longitudinal section of the conveying attachment, Figure 6 a section on line 6—6 of Figure 5, Figure 7 a detail of part of the conveyor chain, and Figure 8 a section on line 8—8 of Figure 7.

For convenience I will use tomatoes as a short term for designating the goods to be canned.

Referring to the drawings, 1 indicates the main frame of a canning machine, 2 a drive shaft, 3 a bevel gear thereon meshing with a bevel gear 4 on a vertical shaft 5 to which is fixed a star wheel 6 which moves the cans upon a bed plate 7, and 8 a funnel wheel, rotated by shaft 5, having a plurality of funnels 9 adapted to direct the material to the cans. These parts, broadly speaking, are old and have but incidental relation to the present invention.

10 indicates an inclined water tight casing adapted to house the conveyor and measuring units for solids. The casing is supported by frame members 11 detachably secured to the main frame. It carries a hopper 12 and is provided at its upper end with an oblong opening surrounded by a depending flange 13 adapted to direct the tomatoes into funnels 9. Within the casing and parallel with its bottom I provide a plate 14, mounted for adjustment perpendicularly to the bottom, and hereinafter called a bed plate. The bed plate is provided with a discharge opening surrounded by a depending flange 15 which telescopes in flange 13. Cylinders 16, slidable upon the bed plate, are provided at their bottoms with radially extending flanges 17 which take under continuous parallel guide plates 18 and 19 on the bed plate. Cylinders 16 telescope into slidably mounted cylinders 20 supported in the upper part of the casing. In the form shown the upper part of cylinders 20 is provided with an annular groove 21 in which the hub 22 of a plate 23 is rotatably seated, as shown in Figures 5 and 8. Plates 23, extend from the side to the center of casing 10, and the plate on each cylinder extends to an adjacent cylinder and is provided with a curved recess 24 the wall of which embraces one half of the adjacent cylinder. The heel of one plate overlaps the toe of an adjacent plate, as shown in Figure 7, and the series of plates form a continuous shelf which prevents tomatoes from falling into the space below. The outer edges of plates 23 are supported by ledges 25 and 26 secured to the upper part of casing 10. The outer ledge 25 is continuous, with straight sides and curved ends, and the inner ledges 26 extend opposite the straight sides only of the outer ledge. The ledges hold cylinders 20 against axial movement relatively to cylinders 16 and provide a track upon which the cylinders may slide. Cylinders 20 are provided with oppositely extending lugs 27 and 28, the lugs of adjacent cylinders being connected by pivot pins 29 and the series of cylinders with their connections constitute an endless conveyor. Star wheels 30 and 31, having curved recesses 32, the walls of which are adapted to partly embrace cylinders 20, are mounted within the casing, and just within the feed and delivery end of the conveyor, upon shafts 33 and 34. Shaft 33 extends through a stuffing box 35 in the bottom of the casing and carries a bevel gear 36 which meshes with a bevel gear 37 on a shaft 38 having its bearings in a bracket 39 extending from a frame member 11. A sprocket wheel 40 is fixed to shaft 38 and is connected by an endless chain 41 to a sprocket wheel 42 on drive shaft 2. The top of casing 10, on the feed side and at its upper end, is open in order that the conveyor may be readily accessible to the operator.

The sides of the hopper extend upwardly to a point approximately in line with the lower edge of the discharge opening in the bed plate, and is open at the upper end, the inclination being such that the part of the hopper adjacent the discharge opening is never filled.

The bed plate having been adjusted so that the capacity of the measuring units will correspond with that of the cans to be filled and the machine being in operation, tomatoes from the hopper fall into the open tops of the measuring units. The measuring units may be filled to the exact extent required or may receive somewhat more or less than their quota. In case a measuring unit receives more or less than its quota, it is a simple matter for the operator to remove a tomato or add a tomato of the required size, or to substitute a small tomato for a large one or a large one for a small one and thereby insure proper filling of the cans without crushing or bruising the tomatoes. The tomatoes drop through the discharge openings into funnels 9 and pass to cans positioned beneath the funnels.

The upper end of the hopper being open, there is no tendency to crush any tomatoes which may be carried thereby, and the incline of the casing is preferably such that any tomatoes which otherwise might ride above the top of a filled can will roll off and down the incline to the filled part of the hopper.

Inasmuch as the tomatoes are scalded and skinned before being fed to the machine, a material quantity of valuable juice escapes during the feeding process and collects in the lower end of casing 10. To conserve this juice I provide a pipe 43, leading from the bottom of the lower end of the casing to a gear pump 44 from which a pipe 45 leads to a liquid measuring valve 46 and discharging through a pipe 47 into funnels 9. To provide for surplus liquid which may be pumped to the measuring valve, I provide a drain pipe 48 which leads into casing 10 as shown in Figure 1. Preferably this drain pipe leads upwardly from the valve chamber, then downwardly, the vertical part serving to store sufficient surplus juice to counterbalance any minor irregularities in the pumping. The measuring valve is rotated by a bevel gear 49 meshing with a bevel gear 50 on shaft 5. The gear pump may be actuated by a belt and pulley connection with shaft 38, as indicated at 51.

For adjusting the level of bed plate 14, and consequently the capacity of the granular measuring units, I provide rock shafts 55 and 56 mounted in lugs 57 and 58 projecting from the interior of the casing and each carrying bifurcated fingers 59 which engage pins or bolts 60 projecting from the sides of the bed plate near the ends thereof and thereby support the bed plate. The rock shafts project through one side of the casing and each carries a crank arm 61. The crank arms on the respective shafts extend in reverse direction, and their ends are connected by a link 62. Shaft 55 also carries a worm wheel 63 which meshes with a worm screw 64 mounted upon one side of the casing and having a hand wheel 65 fixed thereto. Rotation of the worm screw, acting through the worm wheel, rocks shaft 55 in one direction and, through link 62 actuates shaft 56 in reverse direction thereby raising or lowering fingers 59 on each of the shafts and consequently raising or lowering the bed plate and the measuring cups 16. A gauge 66 graduated for different sizes of cans and a pointer 67, fixed to the end of shaft 56, enables the operator to accurately adjust the level of the bed plate and thereby adjust the capacity of the measuring units.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a canning machine, a casing, provided with a hopper and a discharge opening; a bed plate mounted therein and having a discharge opening registering with the discharge opening of the casing; a series of cylinders slidable upon the bed plate and having flanges extending radially from their base; parallel guide plates on the bed plate overlapping the flanges; a series of cylinders slidably supported in the casing, telescoping with the cylinders on the bed plate and connected to form an endless conveyor, and means for actuating the conveyor.

2. In a canning machine, a casing, provided with a hopper and a discharge opening; a bed plate mounted therein and having a discharge opening registering with the discharge opening of the casing; a series of cylinders slidable upon the bed plate; a series of cylinders telescoping therewith and connected to form an endless conveyor; plates extending radially from the upper ends of said cylinders; ledges carried by the casing adapted to slidably support the plates, and means for actuating the conveyor.

3. In a canning machine, a casing provided with a hopper and a discharge opening; a bed plate mounted therein and having a discharge opening registering with the discharge opening of the casing; a series of cylinders slidable upon the bed plate; a series of cylinders telescoping therewith and connected to form an endless conveyor; plates rotatably mounted upon the upper ends of said cylinders and extending in one direction, from cylinder to cylinder; ledges carried by the casing adapted to slidably support the plates, and means for actuating the conveyor.

4. In a canning machine, a casing provided with a hopper and a discharge opening; a bed plate mounted therein and having a discharge opening registering with the discharge opening of the casing; a series of cylinders slidable upon the bed plate; a series of cylinders telescoping therewith and connected to form an endless conveyor; plates rotatably mounted upon the upper ends of said cylinders and extending in one direction, from cylinder to cylinder and overlapping each other; ledges carried by the casing adapted to slidably support the plates, and means for actuating the conveyor.

5. In a canning machine, a casing provided with a hopper and a discharge opening; a bed plate mounted therein and having a discharge opening registering with the discharge opening of the casing; a series of cylinders slidable upon the bed plate; a series of cylinders telescoping therewith and connected to form an endless conveyor; plates rotatably mounted upon the upper ends of said cylinders and extending in one direction to and partly embracing an adjacent cylinder; ledges carried by the casing adapted to slidably support the plates, and means for actuating the conveyor.

6. In a canning machine, a casing provided with a hopper and a discharge opening; a bed plate mounted in the casing and having a flanged discharge opening, the flange extending through the discharge opening of the casing; a series of cylinders slidable on the bed plate; a series of cylinders telescoping therewith, supported on the casing and connected to form an endless conveyor; means for adjusting the bed plate relatively to the upper series of cylinders, and means for actuating the conveyor.

7. In a canning machine, a casing provided with a hopper and a discharge opening; a bed plate mounted therein; a series of cylinders slidable upon the bed plate; a series of cylinders telescoping therewith, supported by the casing and connected to form an endless conveyor; star wheels rotatably mounted within the casing and having recesses with curved walls adapted to engage the cylinders, and means for imparting rotation to one of the star wheels.

8. In a canning machine, a casing provided with a hopper and a discharge opening; a bed plate mounted therein; a series of cylinders slidable upon the bed plate; a series of cylinders telescoping therewith, supported by the casing and connected to form an endless conveyor; rock shafts mounted in the casing adjacent each end of the bed plate; bifurcated fingers extending from the rock shafts, and engaging pins extending from the bed plate; means for actuating the rock shafts to raise and lower the bed plate, and means for actuating the conveyor.

9. In a canning machine, a casing provided with a hopper and a discharge opening; a bed plate mounted therein; a series of cylinders slidable upon the bed plate; a series of cylinders telescoping therewith, supported by the casing and connected to form an endless conveyor; rock shafts mounted in the casing adjacent each end of the bed plate and having one end extending through the side of the casing; bifurcated fingers extending from the rock shafts and engaging fingers extending from the bed plate; crank arms on the rock shafts extending in opposite directions; a link connecting the ends of the crank arms whereby actuation of one rock shaft will actuate the other, thereby raising or lowering the bed plate, and means for actuating a rock shaft.

10. In a canning machine, a casing provided with a hopper and a discharge opening; a bed plate mounted therein; a series of cylinders slidable upon the bed plate; a series of cylinders telescoping therewith, supported by the casing and connected to form an endless conveyor; rock shafts mounted in the casing adjacent each end of the bed plate and having one end extending through the side of the casing; bifurcated fingers extending from the rock shafts and engaging fingers extending from the bed plate; connections between the rock shafts whereby actuation of one actuates the other in reverse direction; a worm wheel on one of the rock shafts; a worm mounted on the casing and meshing with the worm wheel, and means for actuating the worm screw to rock the shaft.

11. In a canning machine, an inclined water tight casing; means mounted therein for feeding solid material to the cans; a measuring valve having a receiving chamber and adapted to deliver measured quantities of liquid to the cans; a pump; a pipe leading from the low end of the casing to the pump; a pipe leading from the pump to the measuring valve; a drain pipe leading upwardly from the receiving chamber of the valve and then downwardly to the casing, and means for actuating the pump and the valve.

12. In a canning machine, an oblong inclined casing, fluid tight except for a discharge opening at its upper end, an inclined bed plate mounted in the casing and having a discharge opening registering with the discharge opening of the casing; a series of cylinders slidable upon the bed plate; a series of cylinders slidably supported in the casing, telescoping with the first named cylinders, and connected to form an endless conveyor, the two series of cylinders being adapted to serve as measuring units; a hopper adapted to feed material into the measuring units in the lower part of the casing; means for vertically adjusting the bed plate, and means for actuating the conveyor.

13. In a canning machine, an inclined casing; feeding mechanism including a series of open ended receptacles mounted for travel upon the incline, and a hopper adapted to feed material to receptacles on the lower part of the inclined casing, the hopper having side extensions extending approximately to the upper end of the inclined casing and being open at the end of the extensions, to allow material extending above the receptacles to pass unobstructed out of the hopper.

In testimony whereof I have signed my name to this specification.

CHARLES H. AYARS.